US006288848B1

(12) United States Patent
Shinohara et al.

(10) Patent No.: US 6,288,848 B1
(45) Date of Patent: *Sep. 11, 2001

(54) LENS BARREL AND OPTICAL EQUIPMENT

(75) Inventors: Mitsuru Shinohara, Kawasaki; Masanori Ishikawa, Tokyo, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/777,591

(22) Filed: Dec. 31, 1996

(30) Foreign Application Priority Data

| Jan. 8, 1996 | (JP) | 8-018388 |
| Jan. 29, 1996 | (JP) | 8-034321 |
| May 30, 1996 | (JP) | 8-136809 |

(51) Int. Cl.$^7$ ............................. G02B 7/02; G02B 15/14; H01L 41/04
(52) U.S. Cl. .................. 359/696; 359/824; 359/696; 310/323
(58) Field of Search ................... 359/823, 824, 359/696, 697, 698; 396/133, 52, 53; 310/323, 328

(56) References Cited

U.S. PATENT DOCUMENTS

| 3,554,095 | * | 1/1971 | Bobst | 92/57 |
| 4,793,689 | * | 12/1988 | Aoyagi et al. | 359/696 |
| 4,963,000 | * | 10/1990 | Kawai | 359/824 |
| 5,052,781 | * | 10/1991 | Iizuka | 359/823 |
| 5,352,959 | * | 10/1994 | Eguchi et al. | 310/323 |
| 5,428,260 | * | 6/1995 | Suzuki | 310/323 |
| 5,526,188 | * | 6/1996 | Kanno et al. | 359/698 |
| 5,546,233 | * | 8/1996 | Imanari et al. | 359/696 |
| 5,633,553 | * | 5/1997 | Suzuki | 310/323 |
| 5,656,881 | * | 8/1997 | Atsuta | 310/316 |
| 5,663,842 | * | 9/1997 | Takayama et al. | 359/823 |
| 5,708,872 | | 1/1998 | Fukino | 396/133 |

FOREIGN PATENT DOCUMENTS 6-11636    1/1994   (JP) .

* cited by examiner

Primary Examiner—Ricky Mack
(74) Attorney, Agent, or Firm—Fitzpatrick, Cella, Harper & Scinto

(57) ABSTRACT

A lens barrel comprising a vibration motor including an annular rotor and an annular stator provided coaxially with the optical axis, a first rotary ring capable of rotation about the optical axis, a first rotary member receiving a rotational force from the first rotary ring or the rotor and adapted to rotate about a rotary shaft extending in a radial direction perpendicular to the optical axis, a second rotary ring having the first rotary member, a first pressurizing device for applying pressure for maintaining the rotor and the stator of the vibration motor in mutual pressure contact, and a second pressurizing device for applying pressure for maintaining the first rotary ring and the first rotary member in mutual pressure contact, wherein the first rotary ring, the rotor and the first rotary member constitute a differential mechanism, and the first rotary member effects revolution about the optical axis by the differential mechanism and rotates the second rotary ring about the optical axis.

48 Claims, 8 Drawing Sheets

LENS BARREL AND OPTICAL EQUIPMENT

BACKGROUND OF THE INVENTION

1. Field of the Invention

The present invention relates to a lens barrel and an optical equipment, and more particularly to a lens barrel and an optical equipment that allow an automatic focusing operation by a vibration motor such as an ultrasonic motor and a manual focusing operation without any particular switching operation.

2. Related Background Art

FIG. 1 is a cross-sectional view of a conventional lens barrel.

In FIG. 1, there are shown an outer tube 501 of the lens barrel; a fixed tube 503 having an outer tube portion 503a positioned in front of the outer tube 501 and a helicoid forming portion 503b provided inside the outer tube portion 503a; a manual operating ring 504 fitted on a circumferential groove 503c formed on the external periphery of the outer tube portion 503a of the fixed tube 503 and on a circumferential groove 501a formed on the external periphery of the outer tube 501 and rendered rotatable about the optical axis Z of the lens L; and a lens holder 505 supporting the lens L and provided on the external periphery with a helicoid 505b engaging with a helicoid 503d formed on the internal periphery of the helicoid forming portion 503b of the fixed tube 503. The lens holder 505 is penetrated by a groove 505a extending parallel to the optical axis Z, and a lens holder driving arm 520, to be explained later, having a portion parallel to the optical axis Z is inserted in the groove 505a so as to be slidable only in the radial direction of the lens L.

A tubular member 502 is provided at an end thereof with an outward flange 502a connected by screws 522 with the rear end of the fixed tube 503 and, at the other end, with an inward flange 502b connected by screws 523 with the outer tube 501. On the external periphery of the tubular member 502, there are mounted all the components of an ultrasonic motor 530, an output member 531 in contact with a rotary ring 512 of the ultrasonic motor 530 and a manual operation force entering ring 516 for entering the operation torque of the above-mentioned manual operation ring 504.

In the following, there will be explained the components of the ultrasonic motor 530 and the structure of the output member 531.

The ultrasonic motor 530 is composed of an annular vibration member 506 (corresponding to a stator) having a trapezoidal cross section; an electrostriction element 507 physically adhered to an end face of the vibration member 506; an annular vibration absorbing member 510 composed, for example, of felt and pressed to the surface of the electrostriction element 507; a first annular spacer 509 positioned in contact with an end face of the vibration absorbing member 510; a first annular Belleville spring 508 for pressing the spacer 509 toward the annular vibration member; a first annular nut 511 fitted on a screw portion 502d formed on the external periphery of the tubular member 502; a rotary ring 512 constituting a part of the rotor of the ultrasonic motor 530; a rubber ring 513 for avoiding the transmission of axial vibration to the rotary ring 512; an annular circumferentially movable member 514; and a vibration member rotation-blocking member 515 fitted on the external periphery of the tubular member 502 and having an external rim projection 515a inserted in a groove 506a of the vibration member 506.

The rotary ring 512, the rubber ring 513 and the circumferentially movable member 514 are integrated to constitute the rotor of the ultrasonic motor 530, and a circumferentially traveling wave generated in the vibration member 506 causes the rotor, consisting of the rotary ring 512, the rubber ring 513 and the circumferentially movable member 514, to rotate about the optical axis Z.

The nut 511 is provided for adjusting the contact pressure between the vibration member 506 and the circumferentially movable member 514, by the adjustment of the elastic force of the Belleville spring 508.

An output ring 531 positioned adjacent to the end face of the rotary ring 512 (namely, the rotor) of the ultrasonic motor 530 is composed of a ring 519, rotatably fitted on the external periphery of the tubular member 502; roller support shafts 518 fixed in at least three positions on the periphery of the ring 519 so as to protrude from the external periphery thereof along radial axes perpendicular to the optical axis (axis of the ultrasonic motor); and hollow rollers 517 fitted on the roller support shafts 518.

The ring 519 also serves as the output member of a drive force generating unit 532 (including the ultrasonic motor 530 and the output ring 531), and an L-shaped lens holder driving arm 520, for rotating the lens holder 505, is fixed by a screw 521 to an end face of the ring 519.

The rollers 517 are in contact, at the external periphery thereof, with an end face of the rotary ring 512 and an end face of the manual operation force entering ring 516.

The manual operation force entering ring 516 is rotatably fitted on the tubular member 502 and is in contact, at an end face (at the right side in the drawing), with the external periphery of the rollers 517.

The external peripheral rim of the manual operation force entering ring 516 engages with a recess in the internal periphery of the manual operation ring 504, whereby the ring 516 is rotated by the manual operation ring 504.

The above-mentioned lens holder driving arm 520 is inserted, through a hole 502c penetrating the periphery of the tubular member 502, into the groove 505a of the lens holder 505. The hole 502c penetrating the periphery of the tubular member 502 is an oblong hole extending in the circumferential direction.

The above-mentioned rollers 517 constitute a differential mechanism, positioned between the manual operation force entering ring 516 for the manual focusing operation and the rotary ring 512 of the ultrasonic motor for the auto focusing operation. The differential mechanism uses the output side thereof for driving a focusing lens, whereby the structural feature of the ultrasonic motor is fully exploited, particularly in the manual focusing operation.

The full exploitation of the structural feature of the ultrasonic motor means that, due to a fact that the rotor featuring the ultrasonic motor is maintained in pressure contact with the stator, the non-rotating state of the rotor is constantly maintained by the frictional force between the rotor and the stator except when the motor is driven so that the motor input ring connected to the rotor is also maintained in the non-rotating state without requiring any particular structure.

In the above-explained differential mechanism, the pressure of the Belleville spring 508 maintains the non-rotating state of the manual operation force entering ring 516 even when the rotary ring 512 is rotated, and, in the case of a manual focusing operation by the rotation of the manual operation force entering ring 516, the non-rotating state of the rotor (512–514) of the ultrasonic motor is maintained, since the rotor is maintained in pressure contact with the stator, so that the auto focusing operation and the manual focusing operation can be switched without any switching mechanism.

In the conventional lens barrel explained above, rollers are employed in the planet mechanism in the differential mechanism for switching the manual focusing operation and the auto focusing operation without any converting operation, and the transmission of the driving force is achieved by maintaining these rollers in friction contact on both sides with the output end face constituted by the rotary ring of the ultrasonic motor and with the output end face constituted by the manual operation force entering ring. The pressure for such friction contact utilizes that of the pressurizing member of the stator of the ultrasonic motor and is so set as to balance the slip torques of the friction contacts of the above-mentioned rollers with the output end face of the ultrasonic motor and with the output end face of the manual focusing ring, in order to achieve efficient transmission of the output of the ultrasonic motor. For this reason, in the case of driving a focusing lens having a large driving load, there is generated a slippage in the friction contact with the rollers, whereby the output of the ultrasonic motor cannot be transmitted efficiently and the lens drive cannot be achieved in a satisfactory manner.

SUMMARY OF THE INVENTION

In consideration of the foregoing, the object of the present invention is to provide a lens barrel and an optical equipment, capable of efficiently transmitting the output of a vibration motor, such as an ultrasonic motor, to a driven object.

The above-mentioned object can be attained, according to the present invention, by a lens barrel comprising:

a vibration motor having an annular rotor and an annular stator positioned concentrically with the optical axis;

a first rotary ring rotating about the optical axis;

a first rotary member receiving a rotary force from the first rotary ring or from the rotor and adapted to rotate about a radial rotary axis perpendicular to the optical axis;

a second rotary ring having the first rotary member;

first pressurizing means for applying pressure for maintaining the rotor and the stator of the vibration motor in pressure contact; and second pressurizing means for applying pressure for maintaining the first rotary ring in pressure contact with the first rotary member.

The first rotary ring, the rotor and the first rotary member constitute a differential mechanism, and the first rotary member is rotated about the optical axis by the differential mechanism and causes the second rotary ring to rotate about the optical axis.

Preferably, the lens barrel of the present invention further comprises pressure transmission preventing means for preventing the transmission of the pressure of the second pressurizing means to the contact face of the rotor and the stator.

The pressure transmission preventing means may assume a form to prevent transmission of the pressure of the first pressurizing means to the first rotary member.

In addition, the pressure transmission preventing means may assume:

a form in which at least a part of the rotor receiving the pressure of the first pressurizing means is a trajectory ring constituting a part of a radial ball bearing, and the radial ball bearing constitutes the pressure transmission preventing means;

a form composed of a second rotary member receiving the pressure of the first pressurizing means and rendered rotatable about a radial rotary axis perpendicular to the optical axis, a third rotary member receiving the pressure of the second pressurizing means and rendered rotatable about a radial rotary axis the same as that of the second rotary member, and a rotary shaft therefor; or a form composed of a second rotary member rotatable about a radial rotary axis provided on the second rotary ring and perpendicular to the optical axis, and movement limiting means for limiting the movement of the second rotary member in the pressurizing direction of the second pressurizing means.

In the lens barrel of the present invention, it is preferable that the first rotary member be composed of a first roller and that the first rotary ring and the rotor transmit the rotating force to the first roller by frictional force.

Also in the lens barrel of the present invention, it is preferable that the frictional force at the contact face between the rotor and the first roller be larger than that at the contact face between the first rotary ring and the first roller.

In that case, the frictional coefficient of the first rotary ring can be even smaller than that of the rotor.

Also in the lens barrel of the present invention, it is preferable that the axial movement of the lens be caused by the rotation of the second rotary ring. In such a case, the above-mentioned lens is more preferably a focusing lens for effecting the focusing operation.

The lens barrel of the present invention is applicable to an optical equipment such as a camera.

More specific embodiments of the present invention will be explained in the following.

DETAILED DESCRIPTION OF THE PREFERRED EMBODIMENTS

[Embodiment 1]

Figure 1:
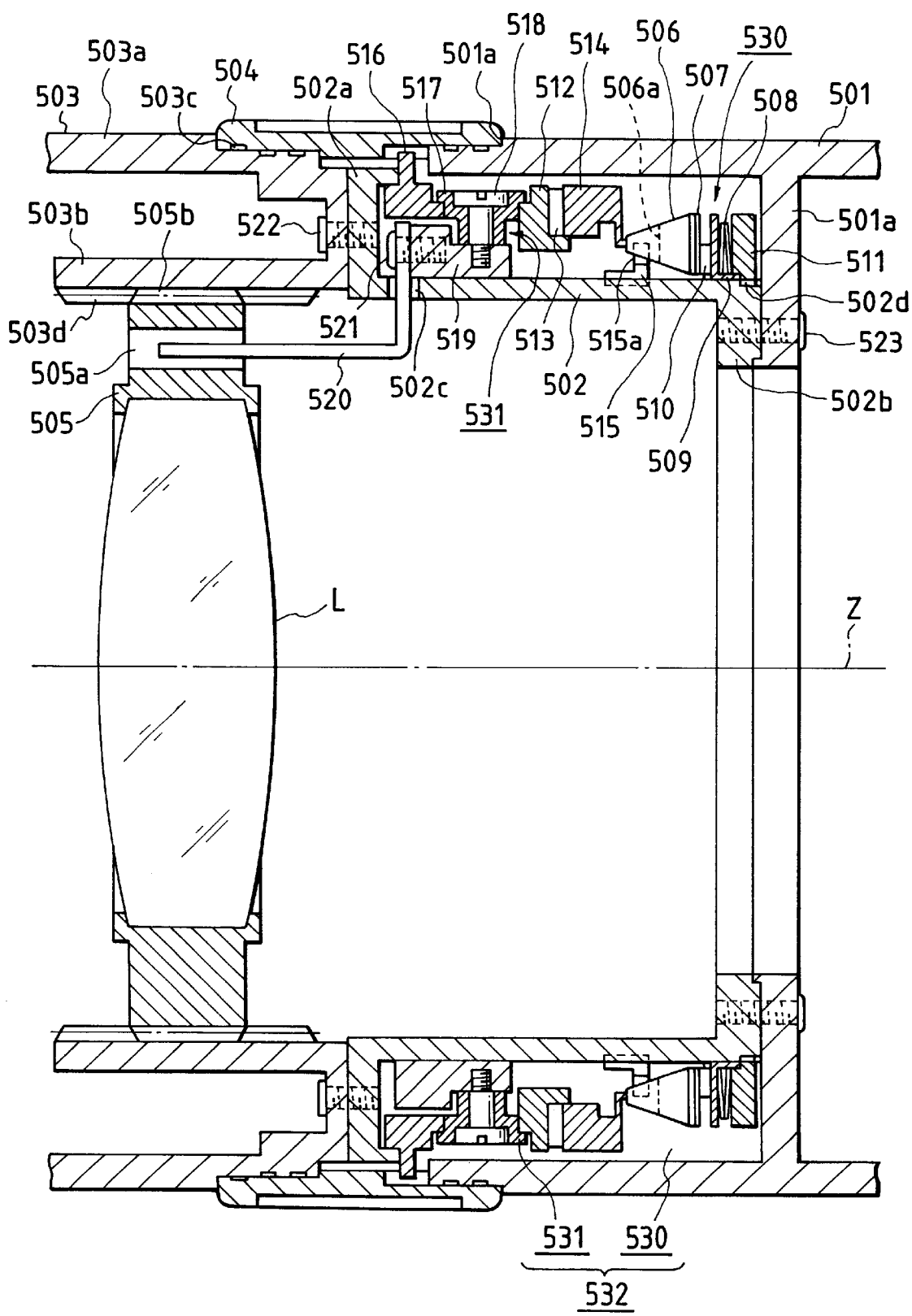
FIG. 1 is a longitudinal cross-sectional view of a conventional lens barrel.
Figure 2:
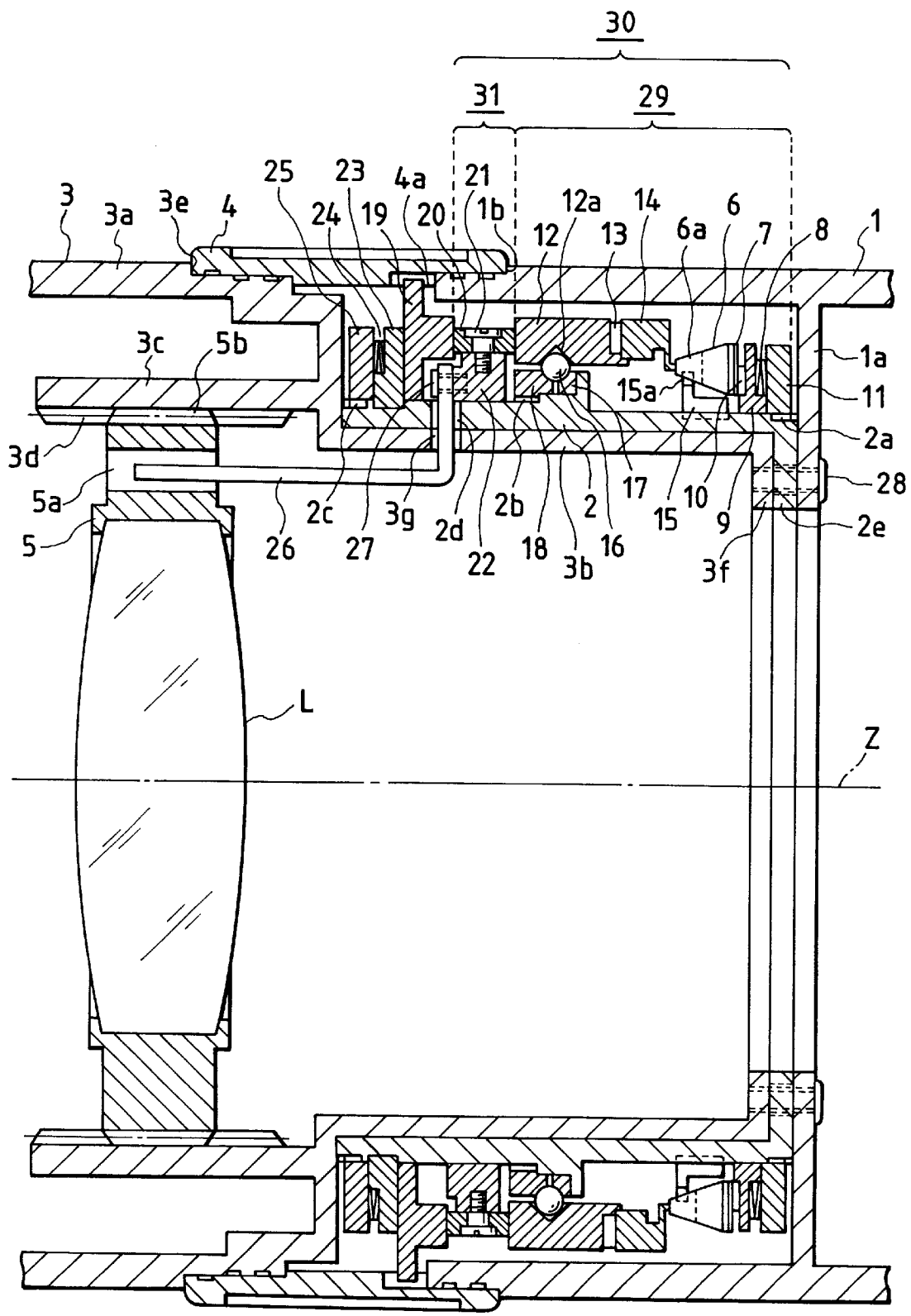
FIG. 2 is a longitudinal cross-sectional view of a lens barrel constituting a first embodiment of the present invention.
Figure 3:
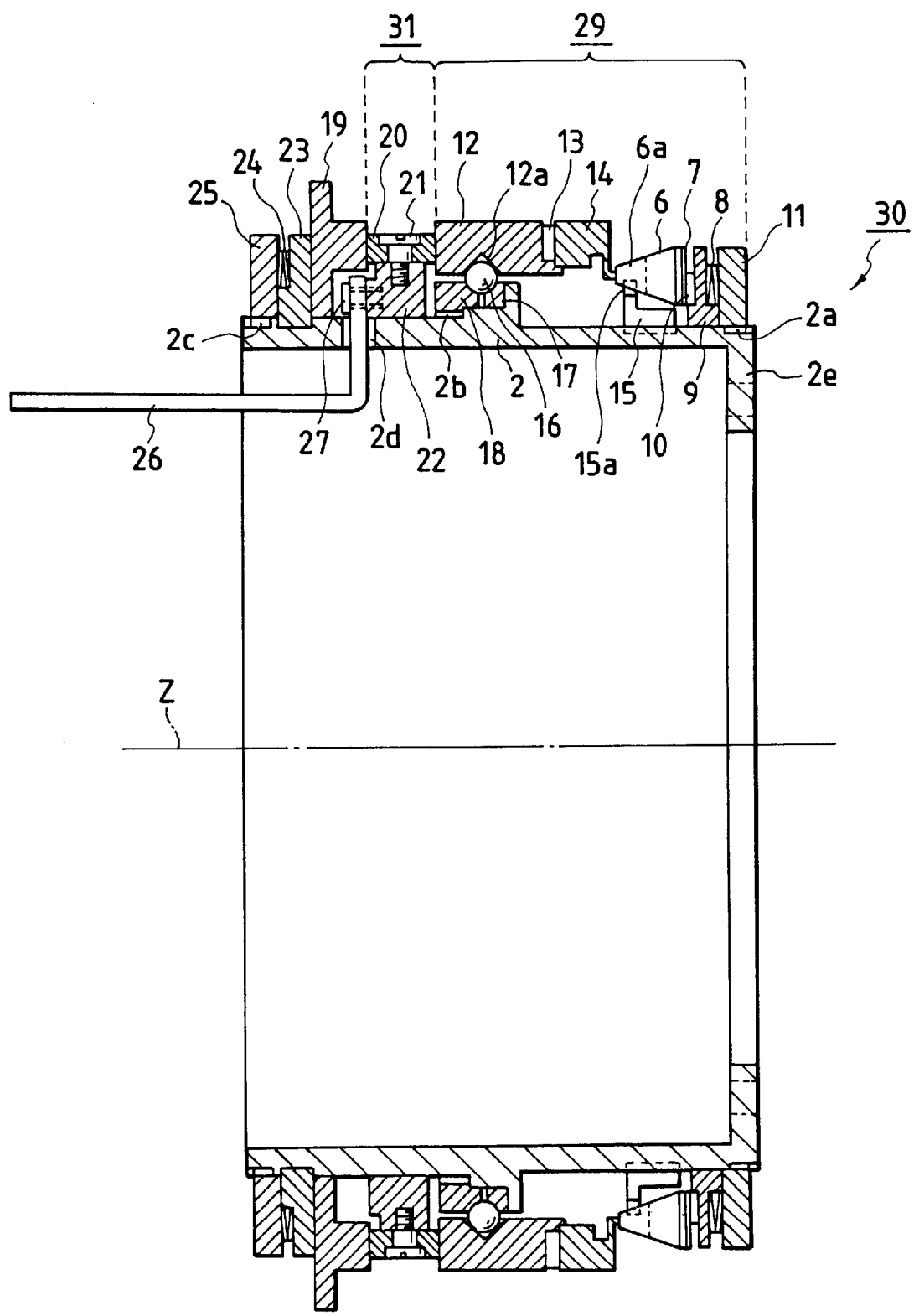
FIG. 3 is a longitudinal cross-sectional view of a drive force generating unit in the first embodiment.

FIG. 2 is a partial longitudinal cross-sectional view of a lens barrel constituting a first embodiment of the present invention, and FIG. 3 is a longitudinal cross-sectional view of a drive force generating unit detachably incorporated in the lens barrel shown in FIG. 2.

In FIGS. 2 and 3, there are shown an outer tube 1 of the lens barrel to be mounted on an optical equipment; a fixed tube 3 having an outer tube portion 3a positioned in front of the outer tube 1, an inner tube portion 3b positioned inside the outer tube 1 and a helicoid forming portion 3c provided inside the outer tube portion 3a; a manual operating ring 4 fitted on a circumferential groove 3e formed on the external periphery of the outer tube portion 3a of the fixed tube 3 and on a circumferential groove 1b formed on the external periphery of the outer tube 1 and rendered rotatable about the optical axis Z of the lens L; and a lens holder 5 supporting the lens L and provided on the external periphery with a helicoid 5b engaging with a helicoid 3d formed on the internal periphery of the helicoid forming portion 3c of the fixed tube 3. The lens holder 5 is penetrated by a groove 5a extending parallel to the optical axis Z, and a lens holder driving arm 26, to be explained later, having a portion parallel to the optical axis Z is inserted in the groove 5a so as to be slidable only in the radial direction of the lens L.

In an annular space between the outer tube 1 and the inner tube portion 3c of the fixed tube 3, there is inserted a tubular drive force generating unit 30 shown in FIG. 3, and a tubular member 2 constituting the frame or base plate of the drive force generating unit 30 is fixed, at an inward flange 2e at the rear end, by screws 28 with an inward flange 3f of the fixed tube 3 and an inward flange 1a of the outer tube 1.

On the external periphery of the tubular member 2, there are mounted, as shown in FIG. 3, all the components of an ultrasonic motor 29, an output member 31 in contact with a rotary ring 12 of the ultrasonic motor 29 and a manual operation force entering ring 19 for entering the rotational torque of the abovementioned manual operation ring 4.

In the following, there will be explained the components of the ultrasonic motor 29 and the output member 31, constituting the drive force generating unit 30 mentioned above.

The ultrasonic motor 29 is composed of an annular vibration member 6 (corresponding to a stator) having a trapezoidal cross section; an electrostriction element 7 physically adhered to an end face of the vibration member 6; an annular vibration absorbing member 10 composed, for example, of felt and pressed to the surface of the electrostriction element 7; a first annular spacer 9 positioned in contact with an end face of the vibration absorbing member 10; a first annular Belleville spring 8 for pressing the spacer 9 toward the annular vibration member; a first annular nut 11 fitted on a screw portion 2a formed on the external periphery of the tubular member 2; a rotary ring 12 constituting a part of the rotor of the ultrasonic motor 29, provided on the internal periphery with a Vshaped ball race groove 12a for receiving bearing balls; a rubber ring 13 for avoiding the transmission of axial vibration to the rotary ring 12; an annular circumferentially movable member 14; a vibration member rotation-blocking member 15 fitted on the external periphery of the tubular member 2 and having an external rim projection 15a inserted in a groove 6a of the vibration member 6; a first ball-receiving ring 17 fitted on the external periphery of the tubular member 2 and having an inclined face at an end; a second ball-receiving ring 18 screwed on a screw portion 2b formed on the external periphery of the tubular member 2 and having an inclined face on an end opposed to the inclined face of the first ball-receiving ring 17; and plural bearing balls 16 supported by the ball race groove 12a of the rotary ring 12, the inclined face of the first ball-receiving ring 17 and the inclined face of the second ball-receiving ring 18.

As the rotary ring 12, the bearing balls 16 and the ball-receiving rings 17, 18 mentioned above constitute a radial ball bearing structure, the rotary ring 12 only receives a frictional resistance of rotation, and therefore, requires only a little rotational torque. Consequently, the load torque applied on the motor is reduced and the output of the motor can be transmitted efficiently.

The rotary ring 12, the rubber ring 13 and the circumferentially movable member 14 mentioned above constitute the rotor of the ultrasonic motor 29, and the circumferentially traveling wave generated in the vibration member 6 causes the rotor composed of the above-mentioned components to rotate about the optical axis Z.

Through the adjustment of the elastic force of the Belleville spring 8, the nut 11 regulates the contact pressure between the vibration member 6 and the circumferentially movable member 14, namely that between the stator and the rotor. The nut 11 and the Belleville spring 8 constitute the first pressurizing means of the present invention.

The output member 31, positioned adjacent to an end face of the rotary ring 12 (namely, the rotor) of the ultrasonic motor 29, is composed, as shown in FIG. 3, of a ring 22 rotatably fitted on the external periphery of the tubular member 2, roller support shafts 21 provided in at least three positions so as to protrude from the external periphery of the ring 22 along radial axes perpendicular to the axis Z of the ring 22 (namely, the axis of the ultrasonic motor), and hollow rollers 20 fitted on the roller support shafts 21.

The ring 22 constitutes a component of the output member 31 of a drive force generating unit 30, and an L-shaped lens holder driving arm 26, for rotating the lens holder 505, is fixed by a screw 27 to an end face of the ring 22.

The rollers 20 are in contact, at the external periphery thereof, with an end face of the rotary ring 12 and an end face of the manual operation force entering ring 19 (hereinafter abbreviated as ring 19). The ring 19 is rotatably fitted on the tubular member 2 and is in contact, at an end face thereof (end face at the right in FIGS. 2 and 3), with the external periphery of the rollers 20 and, at the other end face, with a second annular spacer 23.

A second annular nut 25, engaging with a screw portion 2c formed on the external periphery of the tubular member 2, regulates the contact pressure of the rollers 20 with the rotary ring 12 and with the ring 19 and that between the ring 19 and the spacer 23, under the adjustment of the elastic force of a second annular Belleville spring 24. Thus, the nut 25 and the Belleville spring 24 constitute second pressurizing means of the present invention. Since the rotary ring 12, the bearing balls 16 and the ball-receiving rings 17, 18 constitute a radial ball bearing structure, the pressure of the second pressurizing means is not transmitted to the contact face of the circumferentially movable member.

The external peripheral rim of the ring 19 engages with a recess 4a formed on the internal periphery of the manual operation ring 4, whereby the ring 19 is rotated by the manual operation ring 4. The ring 19 is rendered rotatable only when a driving torque larger than the frictional resistance with the spacer 23 is transmitted from the manual operation ring 4. Consequently, the ring 19 is not rotated unless the user rotates the manual operation ring 4 with a torque exceeding the frictional resistance between the ring 19 and the spacer 23.

The lens holder driving arm 26, fixed to the ring 22 with a screw 27, penetrates through a hole 2d formed on the periphery of the tubular member 2 and a hole 3g formed on the inner tube portion 3b of the fixed tube 3 and is inserted in a groove 5a of the lens holder 5. The hole 2d formed on the periphery of the tubular member 2 and the hole 3e formed on the inner tube portion 3b of the fixed tube 3 are oblong holes extending along the circumferential direction.

In the following, there will be explained the function of the lens barrel of the present embodiment having the above-explained structure.

When the user wishes to drive the lens holder 5 by the ultrasonic motor 29, an unrepresented focusing switch is actuated whereby an unrepresented control circuit applies a voltage to the electrostriction element 7. As a result, the vibration member 6 generates a vibration traveling in the circumferential direction, by which the rotor, consisting of the rotary ring 12, the rubber ring 13 and the circumferentially movable member 14, is rotated about the optical axis Z.

The hollow rollers 20 receive a rotational torque from the ring 12 by the rotation of the rotor, but, in such a state, the ring 19 remains still since the manual operation ring 4 is not rotated. Consequently, the rollers 20 execute revolution along the end face of the above-mentioned ring 19 while rotating about the roller support shafts 21, whereby the ring 22 is rotated about the optical axis Z by the roller support shafts 21. Therefore, the lens holder driving arm 26 is also rotated, together with the ring 22, about the optical axis Z, whereby the lens holder 5 is rotated about the optical axis Z and moves in the axial direction by the function of the helicoids 3d, 5b to achieve automatic focusing.

On the other hand, when the user wishes to drive the lens holder 5 with manual power instead of the power of the ultrasonic motor 29, the aforementioned focusing switch is not manipulated, but the manual operation ring 4 is manually rotated about the optical axis Z. As a result, the ring 19 is rotated, overcoming the frictional resistance with the spacer 23, but, in such a state, the rotary ring 12 constituting the rotor of the ultrasonic motor 29 remains still since the motor 29 is not driven. Therefore, the rollers 20, being rotated by the ring 19, revolve along the end face of the rotary ring 12. As a result, the ring 22 is rotated about the optical axis Z by means of the roller support shafts 21, and the lens holder 5 is rotated by the lens holder driving arm 26 and moves in the axial direction, thereby achieving manual focusing.

[Embodiment 2]

Figure 4:
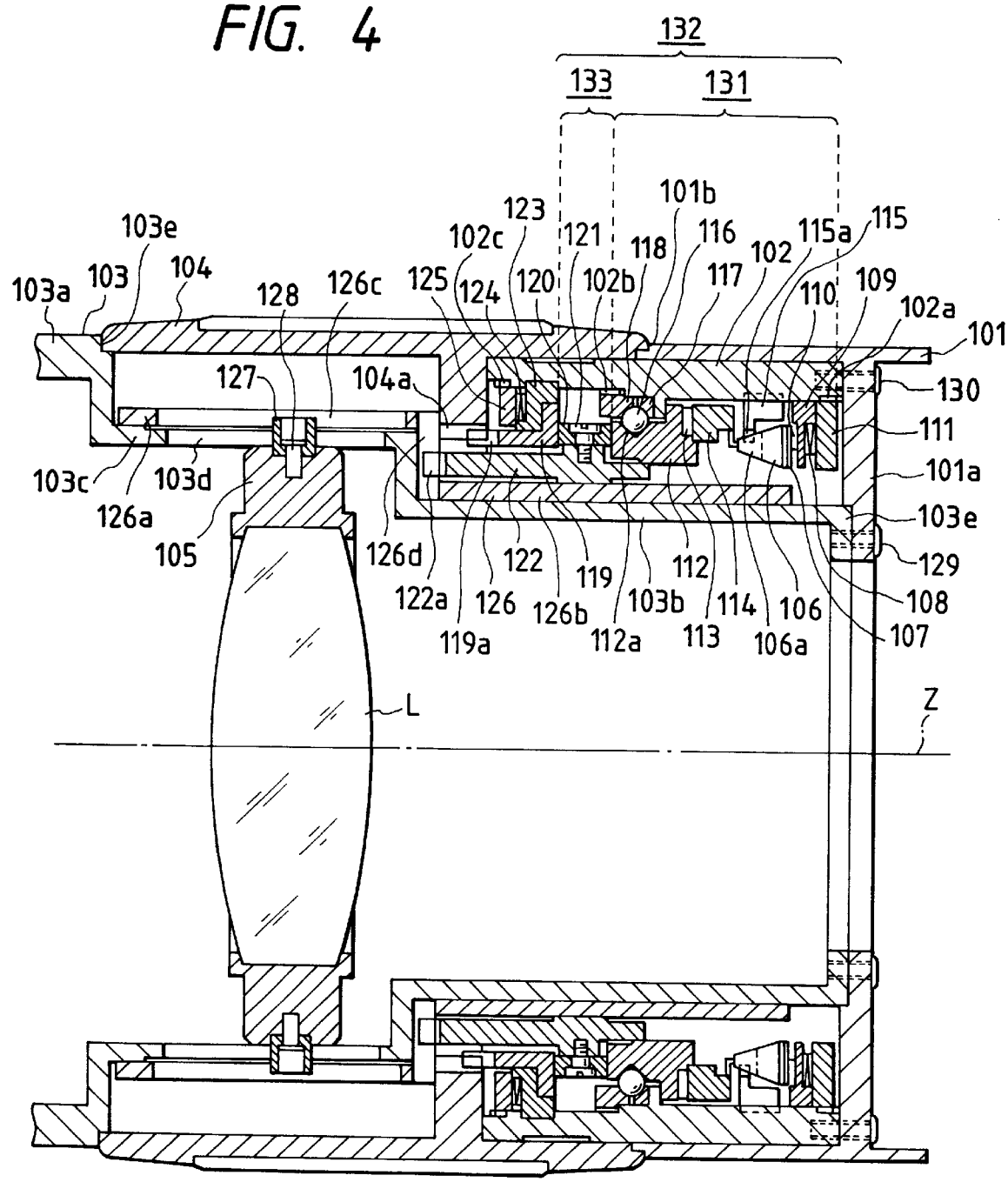
FIG. 4 is a longitudinal cross-sectional view of a lens barrel constituting a second embodiment of the present invention.
Figure 5:
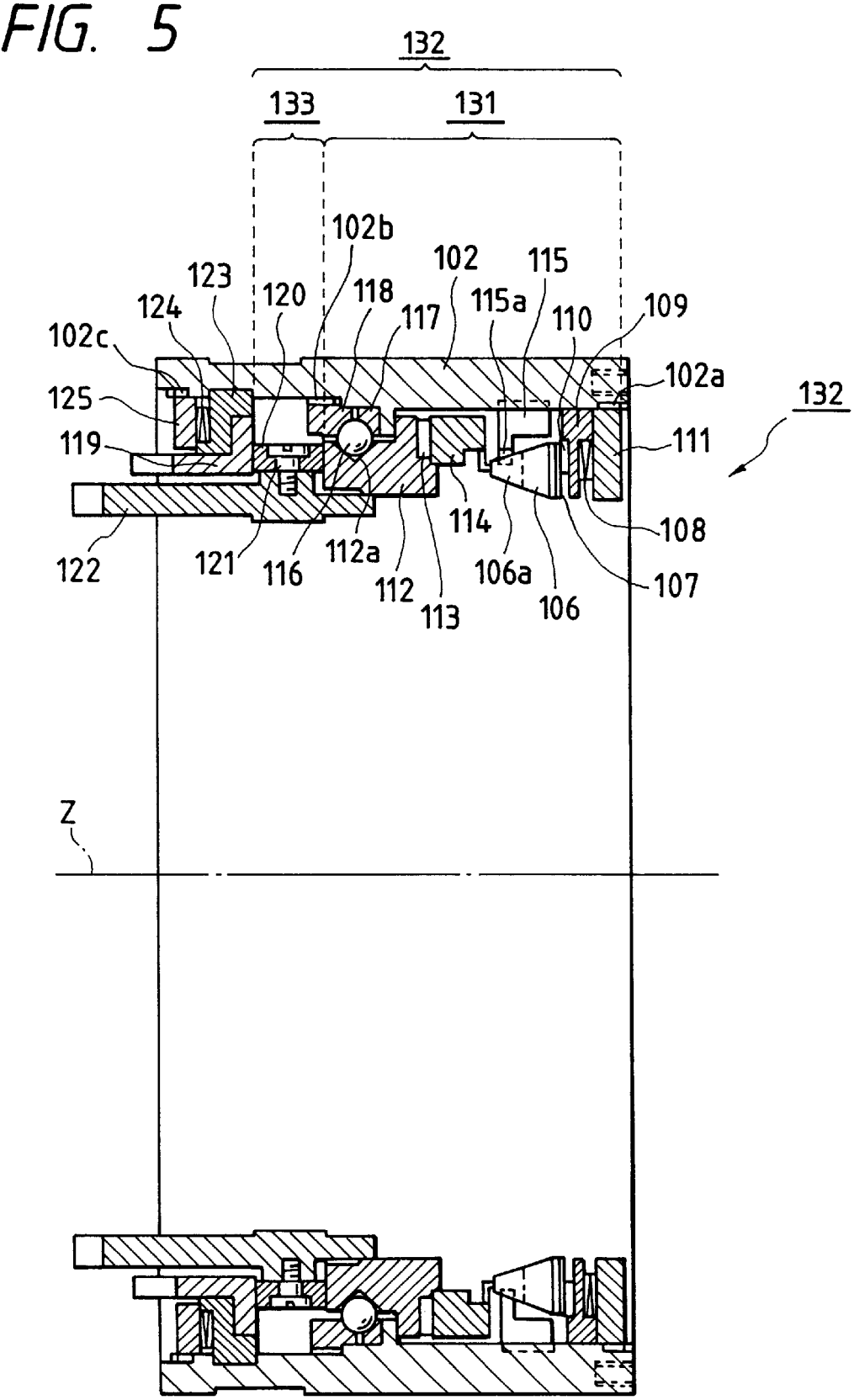
FIG. 5 is a longitudinal cross-sectional view of a drive force generating unit in the second embodiment.

FIG. 4 is a partial longitudinal cross-sectional view of a lens barrel constituting a second embodiment of the present invention, and FIG. 5 is a longitudinal cross-sectional view of a drive force generating unit detachably incorporated in the lens barrel shown in FIG. 4.

In FIGS. 4 and 5, there are shown an outer tube 101 of the lens barrel; a fixed tube 103 having an outer tube portion 103a positioned in front of the outer tube 101, an inner tube portion 103b positioned inside the outer tube 101 and a cam hole forming portion 103c provided inside a manual operation ring 104; a manual operating ring 104 fitted on a circumferential groove 103e formed on the external periphery of the outer tube portion 103a of the fixed tube 103 and on a circumferential groove 101b formed on the external periphery of the outer tube 101 and rendered rotatable about the central axis Z of the lens L (namely, the optical axis); and a lens holder 105 supporting the lens L and engaging, by rollers 127 to be explained later, with cam holes 103d formed on the cam hole forming portion 103c of the fixed tube 103. The rollers 127 are mounted with screws 128 so as to protrude radially from the optical axis Z.

In an annular space between the outer tube 101 and the inner tube portion 103b of the fixed tube 3, there is inserted a tubular drive force generating unit 132 shown in FIG. 5, and a tubular member 102 constituting the frame or base plate of the drive force generating unit 132 is fixed, at the rear end thereof, by screws 130 with an inward flange 101a of the outer tube 101.

On the internal periphery of the tubular member 102, there are mounted, as shown in FIG. 4, all the components of an ultrasonic motor 131, an output member 133 in contact with the rotary ring 112 of the ultrasonic motor 131 and a manual operation force entering ring 119 for entering the rotary torque of the above-mentioned manual operation ring 104.

In the following there will be explained the components of the ultrasonic motor 131 and the structure of the output member 133.

The ultrasonic motor 131 is composed of an annular vibration member 106 having a trapezoidal cross section; an electrostriction element 107 physically adhered to an end face of the vibration member 106; and annular vibration absorbing member 110 composed, for example, of felt and pressed to the surface of the electrostriction element 107; a first annular spacer 109 positioned in contact with an end face of the vibration absorbing member 110; a first annular Belleville spring 108 for pressing the spacer 109 toward the annular vibration member; a first annular nut 111 fitted on a screw portion 102a formed on the internal periphery of the tubular member 102; a rotary ring 112 constituting a part of the rotor of the ultrasonic motor 131, provided on the external periphery with a V-shaped ball race groove 112a for receiving bearing balls: a rubber ring 113 for avoiding the transmission of axial vibration to the rotary ring 112; an annular circumferentially movable member 114; a vibration member rotation-blocking member 115 fitted on the internal periphery of the tubular member 102 and having an external rim projection 115a inserted in a groove 106a of the vibration member 106; a first ball-receiving ring 117 fitted on the internal periphery of the tubular member 102 and having an inclined face at an end; a second ball-receiving ring 118 screwed on a screw portion 102b formed on the internal periphery of the tubular member 102 and having an inclined face on an end opposed to the inclined face of the first ball-receiving ring 117; and plural bearing balls 116 supported by the ball race groove 112a of the rotary ring 112, the inclined face of the first ball-receiving ring 117 and the inclined face of the second ball-receiving ring 118.

As the rotary ring 112, the bearing balls 116 and the ball-receiving rings 117, 118 mentioned above constitute a radial ball bearing structure, the rotary ring 112 only receives a frictional resistance of rotation, and therefore, requires only a little rotational torque. Consequently, the load torque applied on the motor is reduced and the output of the motor can be transmitted efficiently.

The rotary ring 112, the rubber ring 113 and the circumferentially movable member 114 mentioned above constitute the rotor of the ultrasonic motor 131, and the circumferentially traveling wave generated in the vibration member 106 causes the rotor composed of the above-mentioned components to rotate about the optical axis Z.

Through the adjustment of the elastic force of the Belleville spring 108, the nut 111 regulates the contact pressure between the vibration member 106 and the circumferentially movable member 114. Thus, the nut 111 and the Belleville spring 108 constitute the first pressurizing means of the present invention.

The output member 133, positioned adjacent to an end face of the rotary ring 112 (namely, the rotor) of the ultrasonic motor 131, is composed, as shown in FIG. 5, of a ring 122 rotatably fitted on the external periphery of a rotary tube 126 to be explained later, roller support shafts 121 provided in at least three positions so as to protrude from the external periphery of the ring 122 along radial axes perpendicular to the axis Z of the ring 122 (namely, the axis of the ultrasonic motor), and hollow rollers 120 fitted on the roller support shafts 121.

Inside the above-mentioned ring 122, there is positioned the rotary tube 126 constituting the output member 133 of the drive force generating unit 132. The rotary tube 126 is so fitted as to be capable of rotation only, on the external periphery of the internal peripheral portion 103b and the cam hole forming portion 103c of the fixed tube 103, and is provided with a linear hole forming portion 126a fitted on the external periphery of the cam hole forming portion 103c of the fixed tube 103 and an inner tube portion 126b fitted on the external periphery of the inner tube portion 103b of the fixed tube 103. The linear hole forming portion 126a is provided with linear holes 126c in which the rollers 127 engage movably in the direction of the optical axis Z, whereby the lens holder 105 is rotated by the rotation of the rollers 127 about the optical axis Z.

The rollers 120 are in contact, at the external periphery thereof, with an end face of the rotary ring 112 and an end face of the manual operation force entering ring 119 (hereinafter abbreviated as ring 119). The ring 119 is rotatably fitted on the internal periphery of a spacer 123 to be explained later, and is in contact, at an end face thereof (end face at the right in FIGS. 4 and 5), with the external periphery of the rollers 120 and, at the other end face, with the second annular spacer 123.

A second annular nut 125, engaging with a screw portion 102c formed on the internal periphery of the tubular member 102, regulates the contact pressure of the rollers 120 with the rotary ring 112 and with the ring 119 and that between the ring 119 and the spacer 123, under the adjustment of the elastic force of a second annular Belleville spring 124. Thus, the nut 125 and the Belleville spring 124 constitute second pressurizing means of the present invention. Since the rotary ring 112, the bearing balls 116 and the ball-receiving rings 117, 118 constitute a radial ball bearing structure as explained in the foregoing, the pressure of the second pressurizing means is not transmitted to the contact face between the circumferentially movable member 114 and the vibration member 106.

A projection 119a of the ring 119 engages with a recess 104a formed on the internal periphery of the manual operation ring 104, whereby the ring 119 is rotated by the manual operation ring 104. The ring 119 is rendered rotatable only when a driving torque larger than the frictional resistance with the spacer 123 is transmitted from the manual operation ring 104. Consequently, the ring 119 is not rotated unless the user rotates the manual operation ring 104 with a torque exceeding the frictional resistance between the ring 119 and the spacer 123.

In the following, there will be explained the function of the lens barrel of the second embodiment having the above-explained structure.

When the user wishes to drive the lens holder 105 by the ultrasonic motor 131, an unrepresented focusing switch is actuated whereby an unrepresented control circuit applies a voltage to the electrostriction element 107. As a result, the vibration member 106 generates vibration traveling in the circumferential direction, by which the rotor consisting of the rotary ring 112, the rubber ring 113 and the circumferentially movable member 114 is rotated about the optical axis Z.

The hollow rollers 120 receive a rotational torque from the ring 112 by the rotation of the rotor, but, in such a state, the ring 119 remains still since the manual operation ring 104 is not rotated. Consequently, the rollers 120 revolve along the end face of the above-mentioned ring 119 while rotating about the roller support shafts 121, whereby the ring 122 is rotated about the optical axis Z by the roller support shafts 121. Therefore, the rotary tube 126 is also rotated, together with the ring 122, about the optical axis Z, because of the engagement between the projection 122a of the ring 122 and the groove 126b of the rotary tube 126, whereby the lens holder 105 is rotated about the optical axis Z and moves in the axial direction along the cam holes 103d formed in the cam hole forming portion 103c of the fixed tube 103, thereby achieving automatic focusing.

On the other hand, when the user wishes to drive the lens holder 105 with manual power instead of the power of the ultrasonic motor 131, the aforementioned focusing switch is not manipulated but the manual operation ring 104 is manually rotated about the optical axis Z. As a result, the ring 119 is rotated about the optical axis Z, overcoming the frictional resistance with the spacer 123, but, in such a state, the rotary ring 112 constituting the rotor of the ultrasonic motor 131 remains still since the motor 131 is not driven.

Therefore, the rollers 120, being rotated by the ring 119, revolve along the end face of the rotary ring 112. As a result, the ring 122 is rotated about the optical axis Z by means of the roller support shafts 121. Thus, the rotary tube 126 is rotated about the optical axis Z by means of the roller support shafts 121. Thus, the rotary tube 126 is also rotated owing to the engagement between the projection 122a and the groove 126d, and the lens holder 105, being rotated by the rotary tube 126, moves in the axial direction along the cam holes 103d, thereby achieving manual focusing.

[Embodiment 3]

Figure 6:
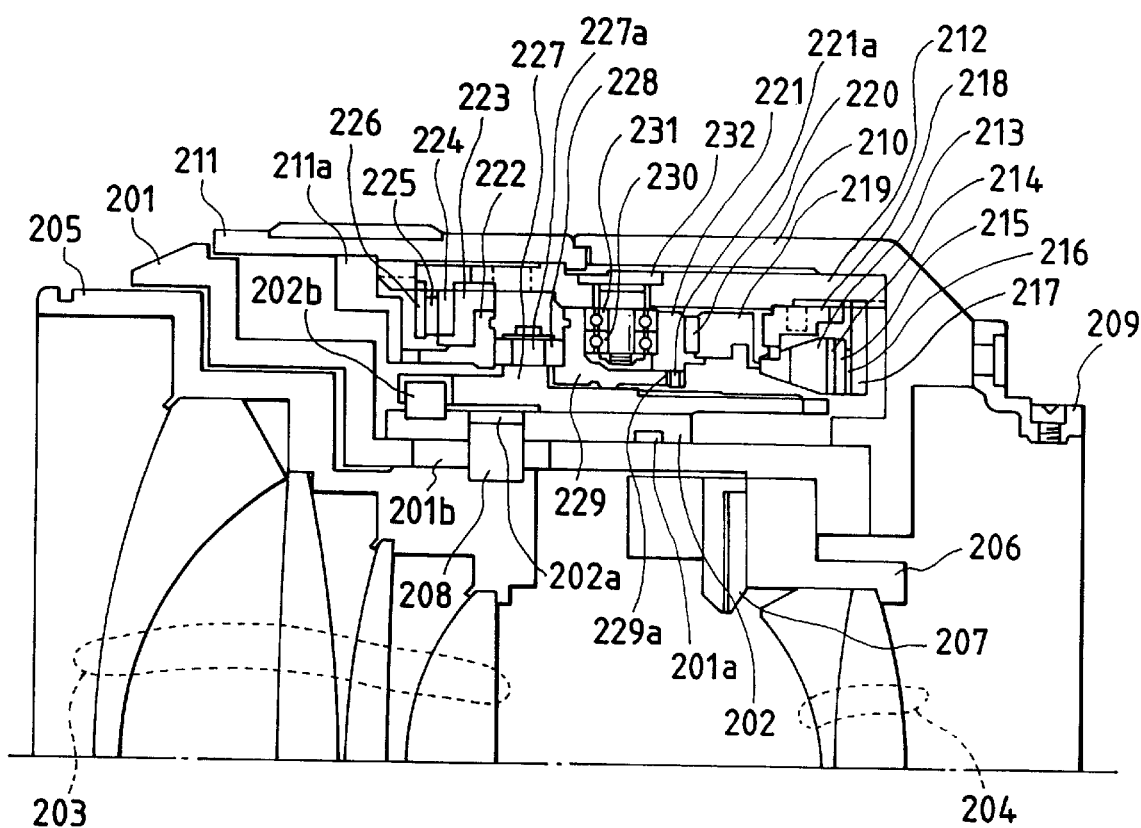
FIG. 6 is a longitudinal cross-sectional view of a lens barrel constituting a third embodiment of the present invention.

FIG. 6 is a partial longitudinal cross-sectional view of a lens barrel constituting a third embodiment of the present invention.

Referring to FIG. 6, a guide tube 201 is provided with a projection 201a for permitting only the rotation in the radial direction of a cam ring 202 to be explained later and inhibiting the axial movement thereof, and a straight groove 201b for engaging with a drive roller 208 to be explained later. A cam ring 202, rotatably engaging with the guide tube 201, is provided with a cam 202a engaging with the drive roller 208 to be explained later, and projection 202b engaging with an output ring 227 to be explained later, for receiving the rotating force. A first lens group 203 serves to adjust the focal position, by movement in the axial direction at the focusing operation. A second lens group 204 is always fixed. A first lens barrel 205, supporting the first lens group, is fitted on the internal periphery of the guide tube 201, and is axially driven by the integrally mounted drive roller 208 to be explained later. A second lens barrel 206, supporting the second lens group, supports a diaphragm unit 207 and is integrally fixed on the guide tube 201. Reference numeral 207 indicates a diaphragm unit. A drive roller 208, integrally mounted on the first lens barrel 205, engages with the straight groove 201b of the guide tube 201 and the cam 202a of the cam ring 202 and serves to axially move the first lens barrel 205 when the cam ring 202 is rotated. A mount 209 is provided for engaging with an unrepresented camera body. A fixed tube 210 integrally supports the guide tube 201 and a focus unit outer tube 212 to be explained later and also integrally supports the mount 209. A focus operation ring 211 rotatably engages with the focus unit outer tube 212 to be explained later, and is provided with a finger 211a for transmitting rotation to a manual connection ring 222 to be explained later.

Focusing units 212–232 constitute an actuator for the focusing operation, and a focus unit outer tube 212 supports the components of the unit. An ultrasonic motor is composed of a vibration member 213 (corresponding to the stator) having a trapezoidal cross section; an electrostriction element 214 formed integrally with the vibration member 213; an annular vibration absorbing member 215 composed, for example, of felt and pressed to the surface of the electrostriction element 214; a first annular Belleville spring 216 for pressing the vibration absorbing member 215 toward the annular vibration member; a first annular nut 217 screwed on the focus unit outer tube 212; a rotation-blocking member 218 engaging with a groove of the vibration member 213 which regulates the pressure of the ultrasonic motor by the adjustment of the screwed position of the nut 217 thereby limiting the rotation of the vibration member 213; a circumferentially movable member 219 pressed to an end face of the vibration member 213; a rubber ring 220 for absorbing the vibration from the circumferentially movable member 219; and a first annular connection ring 221 rotating integrally with the circumferentially movable member 219 through the rubber ring 220 and having a finger 221a for transmitting the rotation to a second connection ring to be explained later.

On the other hand, a manual input portion is composed of a manual connection ring 222 engaging with the finger 212a of the focus operation ring 211 and receiving rotation therefrom; a manual ring collar 223 engaging with the focus unit outer tube 212 so as not to be rotatable, but to be axially movable and pressed to an end face of the manual connection ring 222; a reinforcing plate 224 for increasing the rigidity of the manual ring collar 223; a second annular Belleville spring 225 for biasing the reinforcing plate 224 toward the ultrasonic motor; and a second annular nut 226 screwed on the focus unit outer tube 212 and adapted to regulate the pressure of the manual side by its screwed position, as in the aforementioned nut 217.

The manual input portion composed of the above-explained components constitutes a differential mechanism, in combination with components 227–232 to be explained later.

An output ring 227 engages with the projection 202b of the aforementioned cam ring 202 and is provided, in at least three positions, with support shafts 227a extending in radial directions perpendicular to the optical axis and rotatably supporting hollow first rollers 228. A second connection ring 229, having an engaging portion 229a for engaging with the finger 221a of the aforementioned first connection ring 221 for receiving the rotation therefrom, is pressed, at an end face, to the first rollers 228. Each of bearing structures 230 is composed of an inner ring pressed into a fixed shaft 232 to be explained later, and an outer ring composed of a second roller which is rendered rotatable by bearing balls and is maintained in contact with an end face of the first connection ring 221, thereby being pressed from the side of the ultrasonic motor. Each of the other bearing structures 231 is composed of an inner ring pressed into the fixed shaft 232 to be explained later, and an outer ring composed of a third roller which is rendered rotatable by bearing balls and is maintained in contact with an end face of the second connection ring 229, thereby being pressed from the manual input side through the first rollers 228. Fixed shafts 232 are provided on the focus unit outer tube 212, in at least three positions thereof, extending inwardly along radial directions perpendicular to the optical axis, and support the second and third rollers mentioned above.

The second rollers 230 are not in contact with the end face of the second connection ring 229, while the third rollers 231 are not in contact with the end face of the first connection ring. Owing to such a configuration, the pressure from the side of the ultrasonic motor and that from the manual input side are not transmitted to the opposite side. Consequently, these pressures can be independently selected at optimum levels, and the output of the ultrasonic motor can be transmitted in an efficient manner.

In the following, there will be explained the function of the lens barrel of the present embodiment.

At first, in the auto focusing mode, an unrepresented control circuit applies a voltage to the electrostriction element 214 to generate a circumferentially travelling wave in the vibration member 213, whereby the circumferentially movable member 219, the rubber ring 220 and the first connection ring 221 rotate integrally. The rotation is transmitted to the second connection ring 229, through the finger 221a of the first connection ring 221 and the engaging portion 229a of the second connection ring 229. In this state, the outer rings of the second rollers 230, receiving the pressure from the side of the ultrasonic motor through the end face of the first connection ring 221, and the outer rings of the third rollers 231, receiving the pressure from the manual input side through the end face of the second connection ring 229, rotate about the fixed shafts 232.

The rotation of the second connection ring 229 transmits rotational torque to the first rollers 228, which thus revolve along the end face of the stopped manual connection ring 222 while rotating about the support shafts 227a of the output ring 227, thereby causing the output ring 227 to rotate also about the optical axis. The rotation of the output ring 227 is transmitted to the cam ring 202 through the projection 202b, thereby achieving automatic focusing.

In the present embodiment, as will be apparent from the foregoing description, the circumferentially movable member 219, the rubber ring 220, the first connection ring 221 and the second connection ring 229 constitute the rotor of the ultrasonic motor.

In the following, there will be explained the focusing operation by a manual operation of the user.

When the focus operation ring 211 is rotated, its rotation is transmitted to the manual connection ring 222, which is therefore rotated, overcoming the frictional resistance with the manual ring collar 233.

Since the ultrasonic motor is not driven in this state, the second connection ring 229 remains stopped, so that the first rollers 228 revolve along the end face of the second connection ring 229, while being rotated by the manual connection ring 222. As a result, the output ring 227 is also rotated about the optical axis, and the rotation is transmitted to the cam ring 202 through the projection 202b, thereby achieving manual focusing. In the above-explained configuration, the pressure at the side of the ultrasonic motor is selected at such a level as to fully utilize the power of the ultrasonic motor, while that of the manual input side is selected at such a level as not to cause slippage in the friction contact portion in the differential mechanism, in order to obtain the torque required for driving the lens groups mentioned in the foregoing.

The configurations of the lens barrel shown in the foregoing first to third embodiments provide the ability to arbitrarily select the slip torque of the friction contact in the differential mechanism, regardless of the ability of the ultrasonic motor, thereby enabling transmission of the output of the ultrasonic motor in an efficient manner.

[Embodiment 4]

Figure 7:
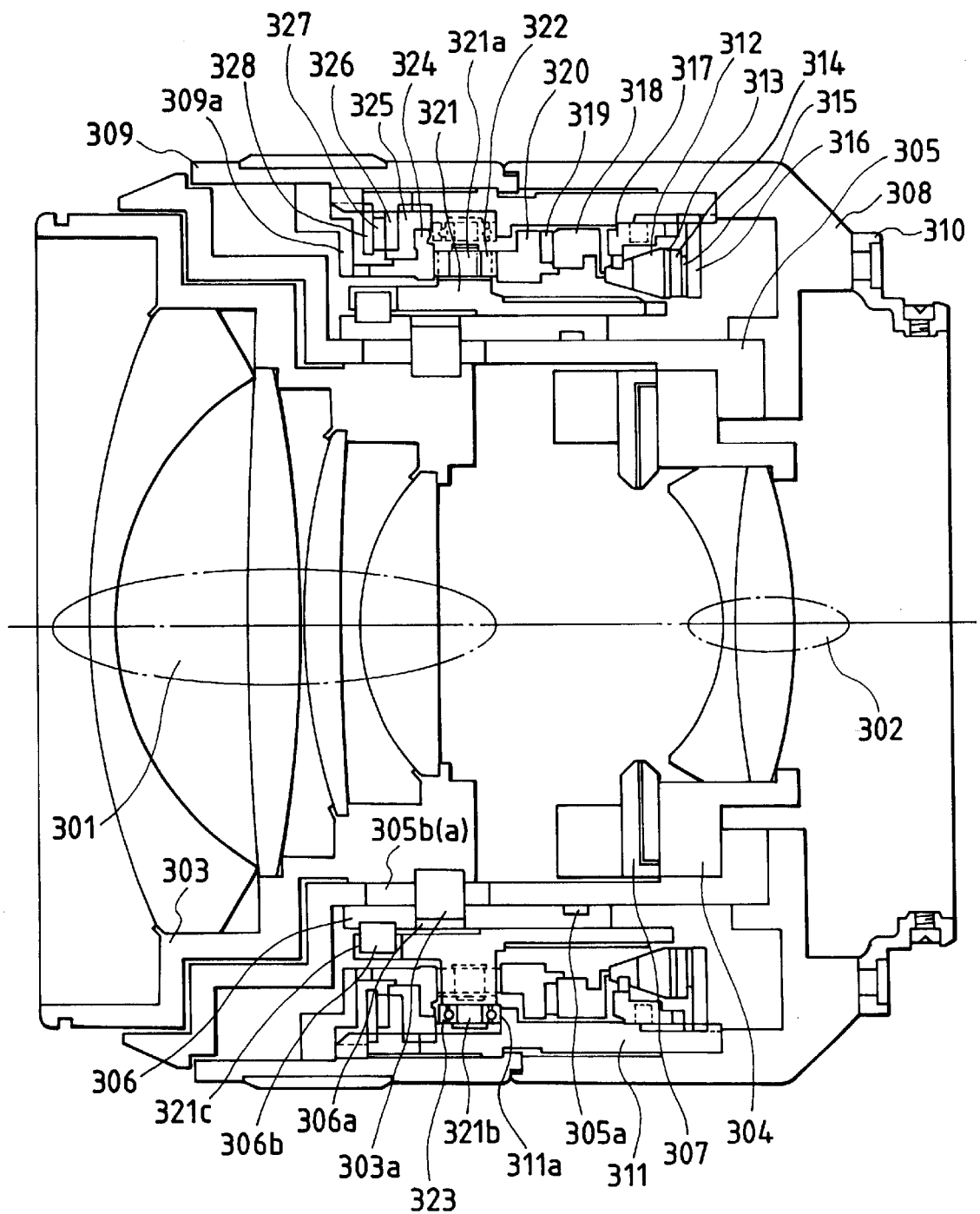
FIG. 7 is a longitudinal cross-sectional view of a lens barrel constituting a fourth embodiment of the present invention.

FIG. 7 is a partial longitudinal cross-sectional view of a lens barrel constituting a fourth embodiment of the present invention, wherein shown are a focusing lens group 301; a fixed lens group 302; a first lens tube 303 supporting the focusing lens group 301 and having drive rollers 303*a* engaging with a guide tube 305 and a cam tube 306 to be explained later; and a second lens tube 304 supporting the fixed lens group 302 and integrally supported by the guide tube 305.

The guide tube 305, supporting the first lens tube 303 in an axially slidable manner, is provided with a finger 305*a* for engaging with a cam ring 306, to be explained later, in a rotatable manner but not movable in the axial direction, and straight grooves 305*b* in which the above-mentioned drive roller 303*a* engage.

A cam ring 306 is so provided as to be capable of rotation only with respect to the guide tube 305 by means of the aforementioned finger 305*a* thereof, and is provided with a cam 306*a* engaging with the drive roller 303*a* of the first lens tube 303 and with a projection 306*b* engaging with and receiving rotation from the output ring 321 of the focus drive unit to be explained later.

A diaphragm unit 307 is supported by the aforementioned second lens tube 304. A fixed tube 308 integrally supports a mount 310 to be explained later and also supports a unit support tube 311 of the focus drive unit to be explained later. A focus operation ring 309 is supported rotatable with respect to the unit support tube 311 of the focus drive unit to be explained later, and transmits rotation, through a connection finger 309*a*, to a manual connection plate 324 of the focus drive unit to be explained later. A mount 310 fixed on the aforementioned fixed tube 308 serves for mechanical connection to an unrepresented camera body.

The focus drive unit is composed of components 311–328. There are provided a unit support tube 311 supported by the fixed tube 308 mentioned above, for supporting the components of the focus drive unit; an annular vibration member (corresponding to the stator) 312 having a trapezoidal cross section; an electrostriction element 313 adhered to an end face of the vibration member 312 for generating a vibration therein; an annular vibration absorbing member 314 pressed to the surface of the electrostriction element 313 and composed, for example, of felt; a first Belleville spring 315 constituting the first pressurizing means and biasing the vibration absorbing member in the direction of the optical axis; a first nut 316 engaging with a screw portion formed on the internal periphery of the unit support tube, for regulating the pressure of the Belleville spring 315 to an optimum pressure capable of obtaining the maximum performance from the vibration motor; a rotation-blocking member 317 supported integrally on the internal periphery of the main body of the unit and serving to block the rotation of the vibration member 312; and a circumferentially movable member 318 which receives a rotational force about the optical axis from the vibration member 312.

A connection ring 320 rotates integrally with the circumferentially movable member 318 across the rubber ring 319 and is maintained in contact with a first roller to be explained later. An output ring 321 is provided with plural shafts 321*a*, 321*b* extending radially from the optical axis at a substantially constant pitch and supporting rotatably first rollers 322 and second rollers 323 to be explained later, and is also provided with a projection 321*c* for transmitting rotation to the cam ring 306. The first rollers 322, supported by plural shafts 321*a* provided on the output ring 321, rotate between the connection plate 320 and a manual connection plate 324 to be explained later and move around the optical axis.

Figure 8:
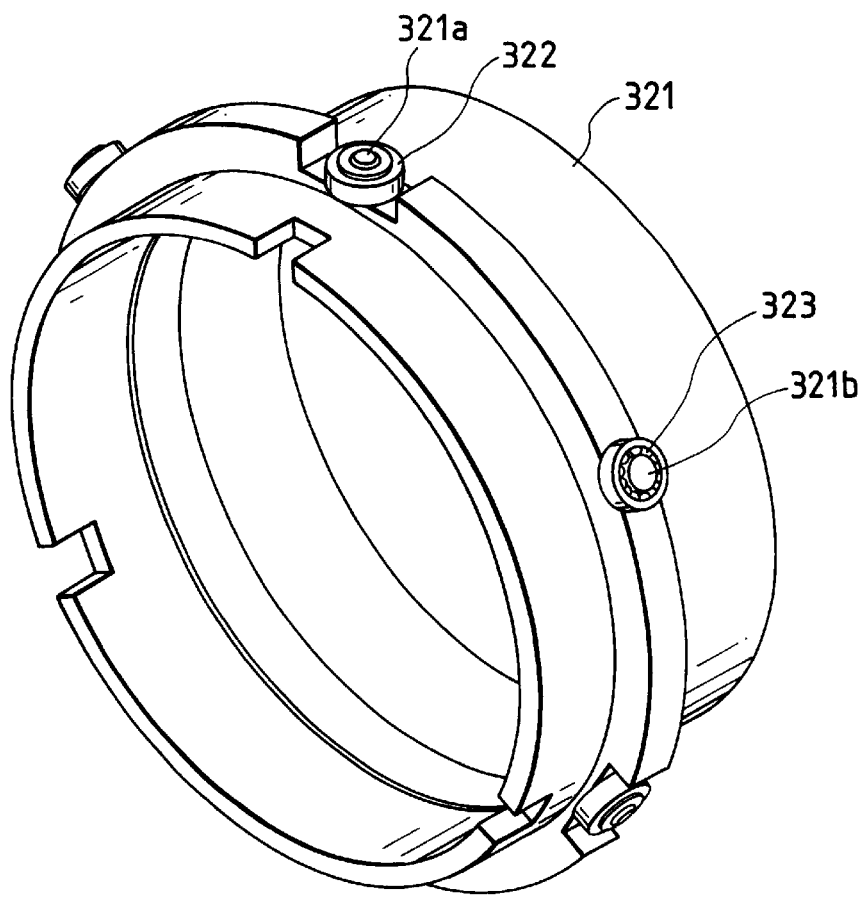
FIG. 8 is a perspective view of an output ring in the fourth embodiment.

The second rollers 323, supported by the plural shafts 321*b* provided on the output ring 321, are biased to the end face of the internal projection 311*a* of the unit support ring, under the pressure of the second pressurizing means to be explained later, received through the first rollers 322 and the output ring 321. In order to reduce the frictional loss, each of the second rollers is divided into an internal member and an external member which are coupled through bearing balls. The second rollers 323 are provided in the same position in the axial direction as the first roller 322 on the output ring 321, but, in order to avoid mutual interference with the first rollers 322, the second rollers 323 are provided in different radial positions and at a different distance from the center, as shown in FIG. 8.

The manual connection ring 324, receiving rotation from the focus operation ring 309, is pressed by the second pressurizing means to be explained later and is maintained in contact, at an end face, with the first rollers. The manual connection ring 324 is formed with such a material that provides a friction coefficient with first rollers 322 smaller than that between the first rollers 322 and the connection ring 320.

A support ring 325, pressed by the second pressurizing means to be explained later and maintained in contact with the manual connection ring 324, engages with the unit support tube so as not to rotate with respect thereto. There are also provided a reinforcing plate 326 for the support ring 325; a second Belleville spring 327 constituting the second pressurizing means and biasing the manual connection ring 324 towards the first rollers in the axial direction; and a second nut 328 engaging with a screw portion formed on the internal periphery of the aforementioned main body of the unit and regulating the pressure of the Belleville spring 327. The second pressurizing means is adjusted with a pressure that is larger than that of the first pressurizing means, in such a manner as to maximize the slip torque caused by the frictional contact between the first rollers 322 and the manual connection ring 324 within an extent not exceeding the slip torque caused by the frictional contact between the first rollers 322 and the connection ring 320.

In the following, there will be explained the function of the lens barrel equipped with the focus drive unit of the above-explained structure.

When the user actuates the focusing switch of an unrepresented camera in the auto focusing mode, an unrepresented control circuit applies, through an unrepresented printed circuit board, a voltage to the electrostriction element 313 to generate a circumferentially traveling vibration in the vibration member 312, whereby the circumferentially movable member 318, the rubber ring 319 and the connection ring 320 rotate about the optical axis. In this manner, in the present embodiment, the circumferentially movable member 318, the rubber ring 319 and the connection ring 320 constitute the rotor of the ultrasonic motor.

The above-mentioned rotation transmits a rotational torque to the first rollers 322, but, as the manual connection plate 324 does not rotate in this state, the first rollers 322 revolve along the end face of the manual connection plate 324, while rotating about the shafts 321 on the output ring. As a result, the output ring 321 also rotates about the optical axis, whereby the cam ring 306 is driven by the projection 306*b* and the first lens tube is moved axially to achieve automatic focusing.

On the other hand, when the user executes manual focusing, the focus operation ring 309 is rotated instead of the actuation of the aforementioned focusing switch, and the rotation is transmitted to the manual connection plate 324. As the ultrasonic motor is not driven in this state, the connection ring 320 remains still, whereby the first rollers 322 revolve along the end face of the connection ring 320 while rotating about the shafts 321*a* on the output ring. As a result, the output ring 321 also rotates about the optical axis, whereby the first lens tube is moved axially to achieve manual focusing.

The lens barrel of the present embodiment can efficiently transmit the output of the ultrasonic motor to the driven member as in the lens barrels of the first to third embodiments, and can reduce the axial length in comparison with the lens barrels of the first to third embodiments, thereby achieving compactization of the device.

[Embodiment 5]

Figure 9:
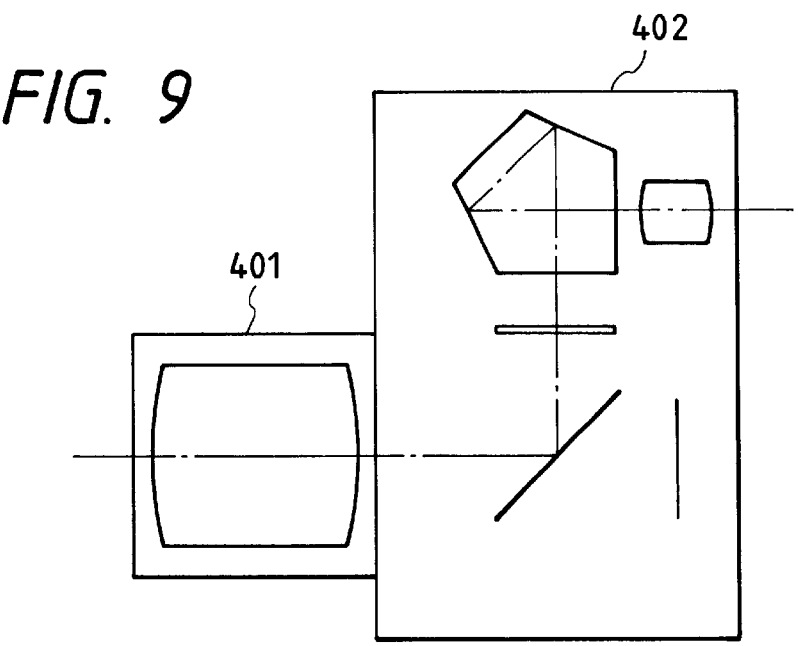
FIG. 9 is a view showing an example of the lens barrel of the present invention mounted on an optical equipment.

FIG. 9 shows an example of mounting of the lens barrel of the present invention on an optical equipment, wherein shown are a lens barrel 401 of the present invention, and a single lens reflex camera 402.

The mounting of the lens barrel of the present invention on an optical equipment allows the provision of such optical equipment with advantages the same as those obtainable in the lens barrels of the first to fourth embodiments.

The member to be driven in the lens barrel of the present invention is not limited to a focusing lens as shown in the foregoing embodiment, but can also be a variator lens or a compensator lens in a zoom lens.

What is claimed is:

1. A lens barrel comprising:

a vibration motor including an annular rotor and an annular stator provided coaxially with an optical axis of said lens barrel;

a first rotary ring for rotating about the optical axis;

a second rotary ring comprising first rotary members, for rotating about respective rotary shafts extending in a radial direction perpendicular to the optical axis, which are pinched by said rotor and said first rotary ring so as to effect revolution by receiving a rotational force from said rotor or said first rotary ring;

a first pressurizing member for applying pressure to said stator for maintaining said rotor and said stator of said vibration motor in mutual pressure contact; and a second pressurizing member for applying pressure to said first rotary ring for maintaining said first rotary ring and said first rotary members in mutual pressure contact, wherein said first rotary ring, said rotor, and said first rotary members constitute a differential mechanism, and said first rotary members effect revolution about the optical axis by said differential mechanism and rotate said second rotary ring about the optical axis.

2. A lens barrel according to claim 1, further comprising:

pressure transmission preventing means for preventing the pressure of said second pressurizing member from being transmitted to a contact face between said rotor and said stator.

3. A lens barrel according to claim 2, wherein said pressure transmission preventing means prevents the pressure of said first pressurizing member from being transmitted to said first rotary members.

4. A lens barrel according to claim 1, wherein said first rotary members are rollers, and said first rotary ring and said rotor are adapted to transmit a rotational force to said rollers by a frictional force.

5. A lens barrel according to claim 2, wherein at least a part of said rotor receiving the pressure of said first pressurizing member is a ring constituting a radial ball bearing, and said pressure transmission preventing means includes said radial ball bearing.

6. lens barrel according to claim 2, further comprising:

a second rotary member for receiving the pressure of said first pressurizing member and for rotating about a rotary shaft extending in a radial direction perpendicular to the optical axis; and a third rotary member for receiving the pressure of said second pressurizing member and for rotating about a rotary shaft the same as that of said second rotary member, wherein said pressure transmission preventing means includes said second and third rotary members and rotary shafts thereof.

7. A lens barrel according to claim 2, further comprising:

a second rotary member for rotating about a rotary shaft extending in a radial direction perpendicular to the optical axis; and movement limiting means for limiting the movement of said second rotary member in the pressing direction of said second pressurizing member, wherein said pressure transmission preventing means includes said second rotary member and said movement limiting means.

8. A lens barrel according to claim 7, wherein said first rotary members are rollers, and said first rotary ring and said rotor transmit a rotational force to said rollers by a frictional force.

9. A lens barrel according to claim 8, wherein the frictional force at the contact face between said rotor and said rollers is larger than that at the contact face between said first rotary ring and said rollers.

10. A lens barrel according to claim 9, wherein the frictional coefficient of said first rotary ring is larger than that of said rotor.

11. A lens barrel according to claim 1, further comprising a lens for moving in the direction of the optical axis by the rotation of said second rotary ring.

12. A lens barrel according to claim 11, wherein said lens includes a focusing lens for effecting a focusing operation.

13. An optical equipment comprising:

a vibration motor including an annular rotor and an annular stator provided coaxially with an optical axis of said optical equipment;

a first rotary ring for rotating about the optical axis;

a second rotary ring comprising first rotary members, for rotating about respective rotary shafts extending in a radial direction perpendicular to the optical axis, which are pinched by said rotor and said first rotary ring so as to effect revolution by receiving a rotational force from said rotor or said first rotary ring;

a first pressurizing member for applying pressure to said stator for maintaining said rotor and said stator of said vibration motor in mutual pressure contact; and a second pressurizing member for applying pressure to said first rotary ring for maintaining said first rotary ring and said first rotary members in mutual pressure contact, wherein said first rotary ring, said rotor, and said first rotary members constitute a differential mechanism, and said first rotary members effect revolution about the optical axis by said differential mechanism and rotate said second rotary ring about the optical axis.

14. An optical equipment according to claim 13, further comprising:

pressure transmission preventing means for preventing the pressure of said second pressurizing member from being transmitted to a contact face between said rotor and said stator.

15. An optical equipment according to claim 14, wherein said pressure transmission preventing means prevents the pressure of said first pressurizing member from being transmitted to said first rotary members.

16. An optical equipment according to claim 13, wherein said first rotary members are rollers, and said first rotary ring and said rotor transmit a rotational force to said rollers by a frictional force.

17. An optical equipment according to aiclaim 14, wherein at least a part of said rotor receiving the pressure of said first pressurizing member is a ring constituting a radial ball bearing, and said pressure transmission preventing means includes said radial ball bearing.

18. An optical equipment according to claim 14, further comprising:
    a second rotary member for receiving the pressure of said first pressurizing member and for rotating about a rotary shaft extending in a radial direction perpendicular to the optical axis; and
    a third rotary member for receiving the pressure of said second pressurizing member and for rotating about a rotary shaft the same as that of said second rotary member,
    wherein said pressure transmission preventing means includes said second and third rotary members and rotary shafts thereof.

19. An optical equipment according to claim 14, further comprising:
    a second rotary member for rotating about a rotary shaft extending in a radial direction perpendicular to the optical axis; and
    movement limiting means for limiting the movement of said second rotary member in the pressing direction of said second pressurizing member,
    wherein said pressure transmission preventing means includes said second rotary member and said movement limiting means.

20. An optical equipment according to claim 19, wherein said first rotary members are rollers, and said first rotary ring and said rotor transmit a rotational force to said rollers by a frictional force.

21. An optical equipment according to claim 20, wherein the frictional force at the contact face between said rotor and said rollers is larger than that at the contact face between said first rotary ring and said rollers.

22. An optical equipment according to claim 21, wherein the frictional coefficient of said first rotary ring is larger than that of said rotor.

23. An optical equipment according to claim 13, further comprising a lens for moving in the direction of the optical axis by the rotation of said second rotary ring.

24. An optical equipment according to claim 23, wherein said lens includes a focusing lens for effecting a focusing operation.

25. A driving device comprising:
    a vibration motor including a rotor and a stator provided coaxially;
    a first rotary ring for rotating about an axis;
    a second rotary ring comprising first rotary members which are pinched by said rotor and said first rotary ring so as to effect revolution by receiving a rotational force from said rotor or said first rotary ring, said second rotary ring being rotated by the rotating of said first rotary members;
    a first pressurizing member for applying pressure to said stator for maintaining said rotor and said stator of said vibration motor in mutual pressure contact; and
    a second pressurizing member for applying pressure to said first rotary ring for maintaining said first rotary ring and said first rotary members in mutual pressure contact.

26. A driving device according to claim 25, further comprising:
    pressure transmission preventing means for preventing the pressure of said second pressurizing member from being transmitted to a contact face between said rotor and said stator.

27. A driving device according to claim 26, wherein said pressure transmission preventing means prevents the pressure of said first pressurizing member from being transmitted to said first rotary members.

28. A driving device according to claim 25, wherein said first rotary members are rollers, and said first rotary ring and said rotor are adapted to transmit rotational force to said rollers by a frictional force.

29. A driving device according to claim 26, wherein at least a part of said rotor receiving the pressure of said first pressurizing member is a ring constituting a radial ball bearing, and said pressure transmission preventing means includes said radial ball bearing.

30. A driving device according to claim 26, further comprising:
    a second rotary member for receiving the pressure of said first pressurizing member and for rotating about a rotary shaft extending in a radial direction perpendicular to an axis of said rotor; and
    a third rotary member for receiving the pressure of said second pressurizing member and for rotating about a rotary shaft the same as that of said second rotary member,
    wherein said pressure transmission preventing means includes said second and third rotary members and rotary shafts thereof.

31. A driving device according to claim 26, further comprising:
    a second rotary member for rotating about a rotary shaft extending in a radial direction perpendicular to an axis of said rotor; and
    movement limiting means for limiting the movement of said second rotary member in the pressing direction of said second pressurizing member,
    wherein said pressure transmission preventing means includes said second rotary member and said movement limiting means.

32. A driving device according to claim 31, wherein said first rotary members are rollers, and said first rotary ring and said rotor transmit a rotational force to said rollers by a frictional force.

33. A driving device according to claim 32, wherein the frictional force at the contact face between said rotor and said rollers is larger than that at the contact face between said first rotary ring and said rollers.

34. A driving device according to claim 33, wherein the frictional coefficient of said first rotary ring is larger than that of said rotor.

35. A driving device according to claim 25, further comprising a lens for moving in the direction of an axis of said rotor by the rotation of said second rotary ring.

36. A driving device according to claim 35, wherein said lens includes a focusing lens for effecting a focusing operation.

37. An optical equipment comprising:
    a vibration motor including a rotor and a stator provided coaxially;

a first rotary ring for rotating about an axis;

a second rotary ring comprising first rotary members which are pinched by said rotor and said first rotary ring so as to effect revolution by receiving a rotational force from said rotor or said first rotary ring, said second rotary ring being rotated by the rotating of said first rotary members;

a first pressurizing member for applying pressure to said stator for maintaining said rotor and said stator of said vibration motor in mutual pressure contact; and a second pressurizing member for applying pressure to said first rotary ring for maintaining said first rotary ring and said first rotary members in mutual pressure contact.

38. An optical equipment according to claim 37, further comprising:

pressure transmission preventing means for preventing the pressure of said second pressurizing member from being transmitted to a contact face between said rotor and said stator.

39. An optical equipment according to claim 38, wherein said pressure transmission preventing means prevents the pressure of said first pressurizing member from being transmitted to said first rotary members.

40. An optical equipment according to claim 37, wherein said first rotary members are rollers, and said first rotary ring and said rotor transmit a rotational force to said rollers by a frictional force.

41. An optical equipment according to claim 38, wherein at least a part of said rotor receiving the pressure of said first pressurizing member is a ring constituting a radial ball bearing, and said pressure transmission preventing means includes said radial ball bearing.

42. An optical equipment according to claim 38, further comprising:

a second rotary member for receiving the pressure of said first pressurizing member and for rotating about a rotary shaft extending in a radial direction perpendicular to an axis of said rotor; and a third rotary member for receiving the pressure of said second pressurizing member and for rotating about a rotary shaft the same as that of said second rotary member, wherein said pressure transmission preventing means includes said second and third rotary members and rotary shafts thereof.

43. An optical equipment according to claim 38, further comprising:

a second rotary member for rotating about a rotary shaft extending in a radial direction perpendicular to an axis of said rotor; and movement limiting means for limiting the movement of said second rotary member in the pressing direction of said second pressurizing members, wherein said pressure transmission preventing means includes said second rotary member and said movement limiting means.

44. An optical equipment according to claim 43, wherein said first rotary members are rollers, and said first rotary ring and said rotor transmit a rotational force to said rollers by a frictional force.

45. An optical equipment according to claim 44, wherein the frictional force at the contact face between said rotor and said rollers is larger than that at the contact face between said first rotary ring and said first rollers.

46. An optical equipment according to claim 45, wherein the frictional coefficient of said first rotary ring is larger than that of said rotor.

47. An optical equipment according to claim 37, further comprising a lens for moving in the direction of an axis of said rotor by the rotation of said second rotary ring.

48. An optical equipment according to claim 47, wherein said lens includes a focusing lens for effecting a focusing operation.

* * * * *

UNITED STATES PATENT AND TRADEMARK OFFICE
CERTIFICATE OF CORRECTION

PATENT NO. : 6,288,848 B1
DATED : September 11, 2001
INVENTOR(S) : Mitsuru Shinohara et al.

It is certified that error appears in the above-identified patent and that said Letters Patent is hereby corrected as shown below:

Column 4,
Line 7, "a form" should read -- ¶ a form --.

Column 5,
Line 9, "groove lb" should read -- groove lb --.
Line 20, "portion 3c" should read -- portion 3b --.
Line 35, "flange la" should read -- flange la --.
Line 31, "abovementioned" should read -- above-mentioned --.
Line 49, "V shaped" should read -- V-shaped --.

Column 8,
Line 12, "a.trapezoidal" should read -- a trapezoidal --.
Line 14, "and" should read -- an --.
Line 25, "balls:" should read -- balls; --.

Column 10,
Line 27, "groove 126b" should read -- groove 126d --.

Column 11,
Line 23, "finger 212a" should read -- finger 211a --.

Column 12,
Line 37, the right margin should be closed up.
Line 41, "collar 233" should read -- collar 223 --; and the right margin should be closed up.

Column 14,
Line 55, "shafts 321" should read -- shafts 321a -- .

Column 15,
Line 65, "lens" should read -- A lens --.

UNITED STATES PATENT AND TRADEMARK OFFICE
CERTIFICATE OF CORRECTION

PATENT NO. : 6,288,848 B1
DATED : September 11, 2001
INVENTOR(S) : Mitsuru Shinohara et al.

It is certified that error appears in the above-identified patent and that said Letters Patent is hereby corrected as shown below:

Column 16,
Line 3, "recei ving" should read -- receiving --.
Line 15, "di rection" should read -- direction --.

Column 17,
Line 7, "aiclaim" should read -- claim --.

Signed and Sealed this

Twenty-fifth Day of June, 2002

*Attest:*

*Attesting Officer*

JAMES E. ROGAN
*Director of the United States Patent and Trademark Office*